No. 755,249. PATENTED MAR. 22, 1904.
J. T. SEALS.
PIPE COUPLING.
APPLICATION FILED MAY 5, 1903.
NO MODEL.

Witnesses
Wm. Roerth.
Chas. S. Hyer.

Inventor
J. T. Seals,
By Victor J. Evans
Attorney

THE NORRIS PETERS CO., PHOTO-LITHO., WASHINGTON, D. C.

No. 755,249. Patented March 22, 1904.

UNITED STATES PATENT OFFICE.

JAMES T. SEALS, OF HAZLETON, INDIANA.

PIPE-COUPLING.

SPECIFICATION forming part of Letters Patent No. 755,249, dated March 22, 1904.

Application filed May 5, 1903. Serial No. 155,752. (No model.)

*To all whom it may concern:*

Be it known that I, JAMES T. SEALS, a citizen of the United States, residing at Hazleton, in the county of Gibson and State of Indiana, have invented new and useful Improvements in Pipe-Couplings, of which the following is a specification.

This invention relates to hose or pipe couplings; and the primary object of the same is to dispense with the necessity of screw-threading the connected ends of hose-pipes or the like and employ a shiftable yoke loosely carried in connection with one end of a pipe or hose and attached to a combined operating and locking means, the said shifting yoke being operative to quickly draw the end of a pipe or hose against that carrying said yoke or as easily permit a release or disconnection of parts of pipes or hose.

The invention consists in the construction and arrangement of the several parts, which will be more fully hereinafter described and claimed.

Figure 1:
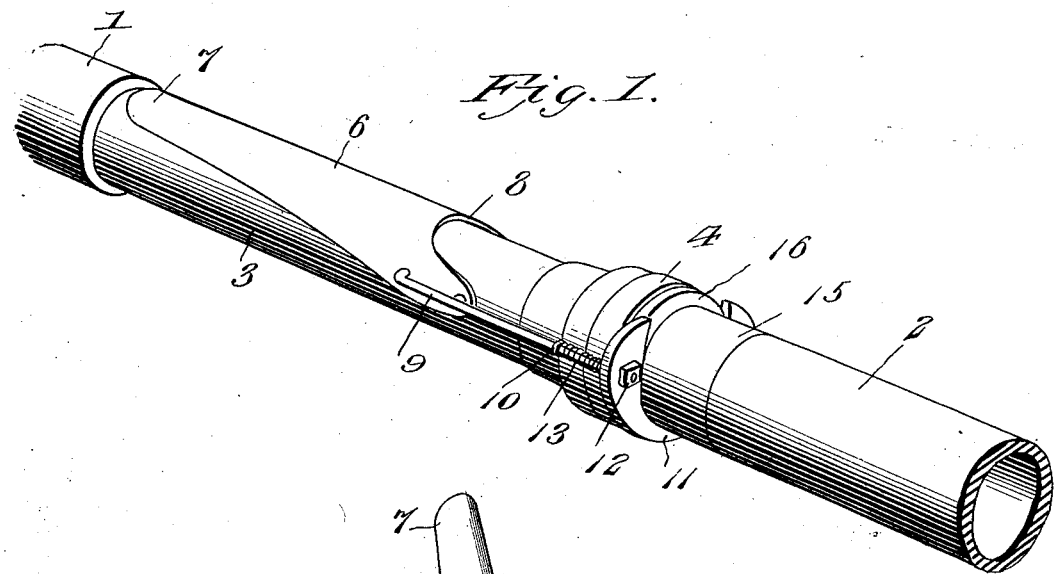
Figure 2:
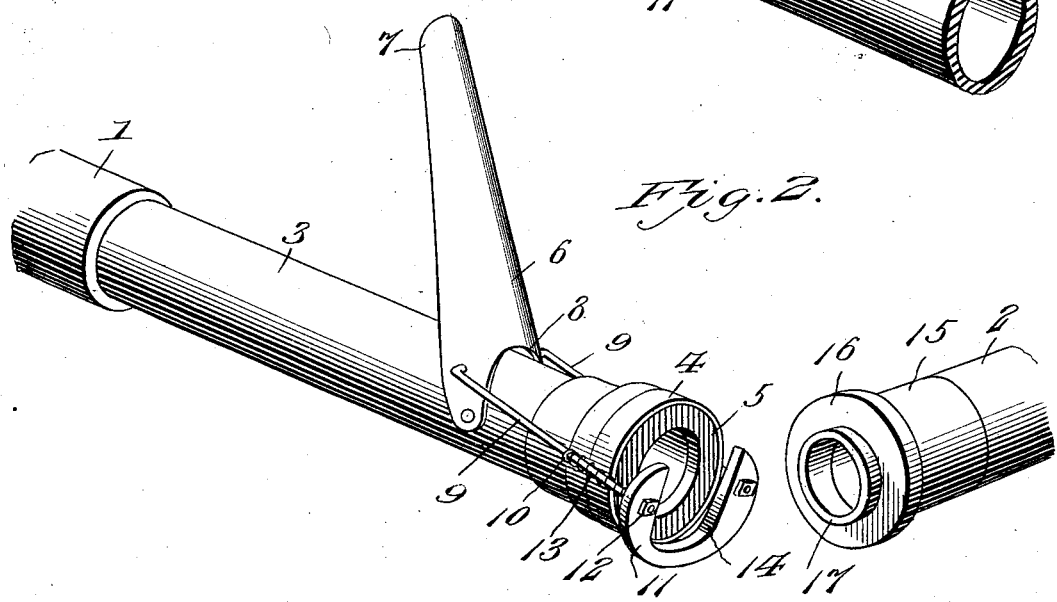
Figure 3:
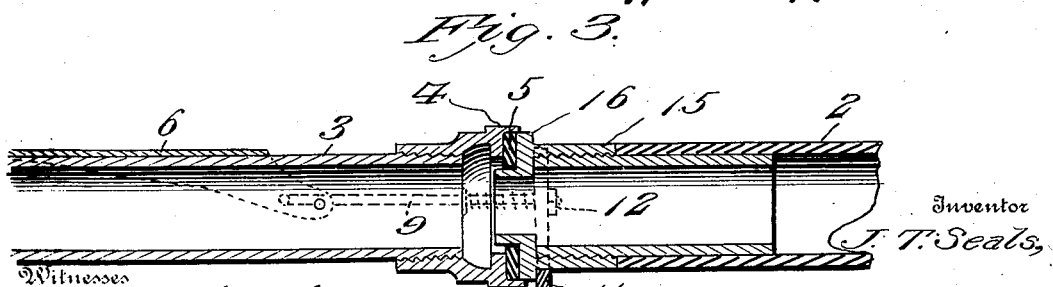

In the drawings, Figure 1 is a perspective view of sections of pipe or hose shown connected by the improved coupling. Fig. 2 is a similar view showing the sections of the pipe or coupling detached. Fig. 3 is a vertical longitudinal section of the connected sections.

Similar numerals of reference are employed to indicate corresponding parts in the several views.

The numerals 1 and 2 designate hose or pipe sections adapted for conveying water or steam. Attached to the section 1 is a coupling member 3, which may be of any suitable length and formed with a coupling-head 4, having a suitable gasket or packing-ring 5 fitted therein. Pivotally mounted on the member 3 is an operating lever or element 6, which is so arranged, as will be hereinafter explained, as to form a lock, and preferably consists of a piece of sheet metal of suitable length of concavo-convex form to snugly bear against the member 3. The lever or element 6 is reduced toward its rear end to form a handle 7, and the opposite end is slotted or bifurcated, as at 8, to span the member 3, and the arms of the bifurcation are terminally pivoted to said member. Rods 9 are movably attached to the arms of the lever or element 6 in rear of the pivotal points of the latter, said rods serving as operating connections, and are freely movable in guide-eyes or analogous devices 10 at diametrically opposite points of the head 4. A shifting yoke 11 is movably held on the outer extremities of the rods 9 by nuts 12, and between the opposite portions of the said yoke and the eyes or other devices 10 springs 13 surround the rods 9 to hold the yoke in proper position relatively to the adjacent end of the head 4 and also operative to throw the yoke away from the end of the head 4 when the lever or element 6 is pulled upwardly into a position of release, as shown by Fig. 2. The yoke 11 has an upwardly-opening slot 14 therein with a lower concave base portion and straight side walls to increase the width of the yoke at the points where the rods 9 engage the same and also to render the yoke more effective in operating to draw the section 2 against the head 4.

The section 2 has a coupling-head 15 with an outstanding flange 16 and a centrally-projecting collar 17 of such diameter as to snugly fit within the opening of the gasket or packing-ring 5.

To connect the sections 1 and 2 by the improved coupling, the lever or element 6 is thrown upwardly, as shown by Fig. 2, and the shifting yoke 11 permitted to move away from the end of the head 4. The coupling-head 15 of the section 2 is then inserted in the yoke, and the latter embraces said head 15 in rear of or close to the flange 6. The lever or element 6 is then thrown down against the member 3 and the yoke and coupling-head 15 are drawn into close engagement with the head 4, the said lever or element when in lowered position acting as a lock to prevent accidental displacement of the yoke from its close relation to the flange 16 in view of the connection of the rods 9 to the lever or element, as heretofore explained. When the lever or element 6 is thrown down and a pulling tension exerted on the rods 9, the springs between the eyes or analogous devices 10 and the shifting yoke are compressed, and when it is desired to disconnect the pipe or hose sections and the lever or element 6 is thrown upwardly the springs force the shifting yoke outwardly away from the end of the head 4 and permit the flange 16 to be easily withdrawn.

It will be seen that the improved coupling permits a quick attachment or detachment of pipe-sections and is particularly adapted for use on fire-hose. The projection of the collar 17 through the gasket or packing-ring 15 when the heads are coupled will result in the formation of a water or steam tight joint, and while the springs 13 are materially important in the operation of the shifting yoke 11 said springs may at times be removed and the yoke will operate equally as well. In other words, should the springs break or become detached the operativeness of the coupling will not be impaired. It is also obvious that the eyes or analogous devices 10 may be of any form; but the diameters of the openings therethrough are sufficiently large to permit the rods 9 to swing therein.

The general proportions and dimensions of the several parts may be changed at will without departing from the spirit of the invention.

Having thus fully described the invention, what is claimed as new, is—

A coupling of the class set forth, comprising pipe-sections having coupling-heads, a shifting yoke held adjacent to one of said heads, the latter having guide devices thereon, an operating element pivotally connected in rear of the head carrying the yoke and arranged to serve as a lock, and connecting-rods movably extending from the element through the guide devices and terminally attached to the yoke.

In testimony whereof I affix my signature in presence of two witnesses.

JAMES T. SEALS.

Witnesses:
   ISAAC SEALS,
   ALONZO BROWN.